Nov. 12, 1940.  H. F. VIEWEG ET AL  2,221,011
METHOD AND APPARATUS FOR PRODUCING MINERAL WOOL
Filed Sept. 3, 1937  3 Sheets-Sheet 1
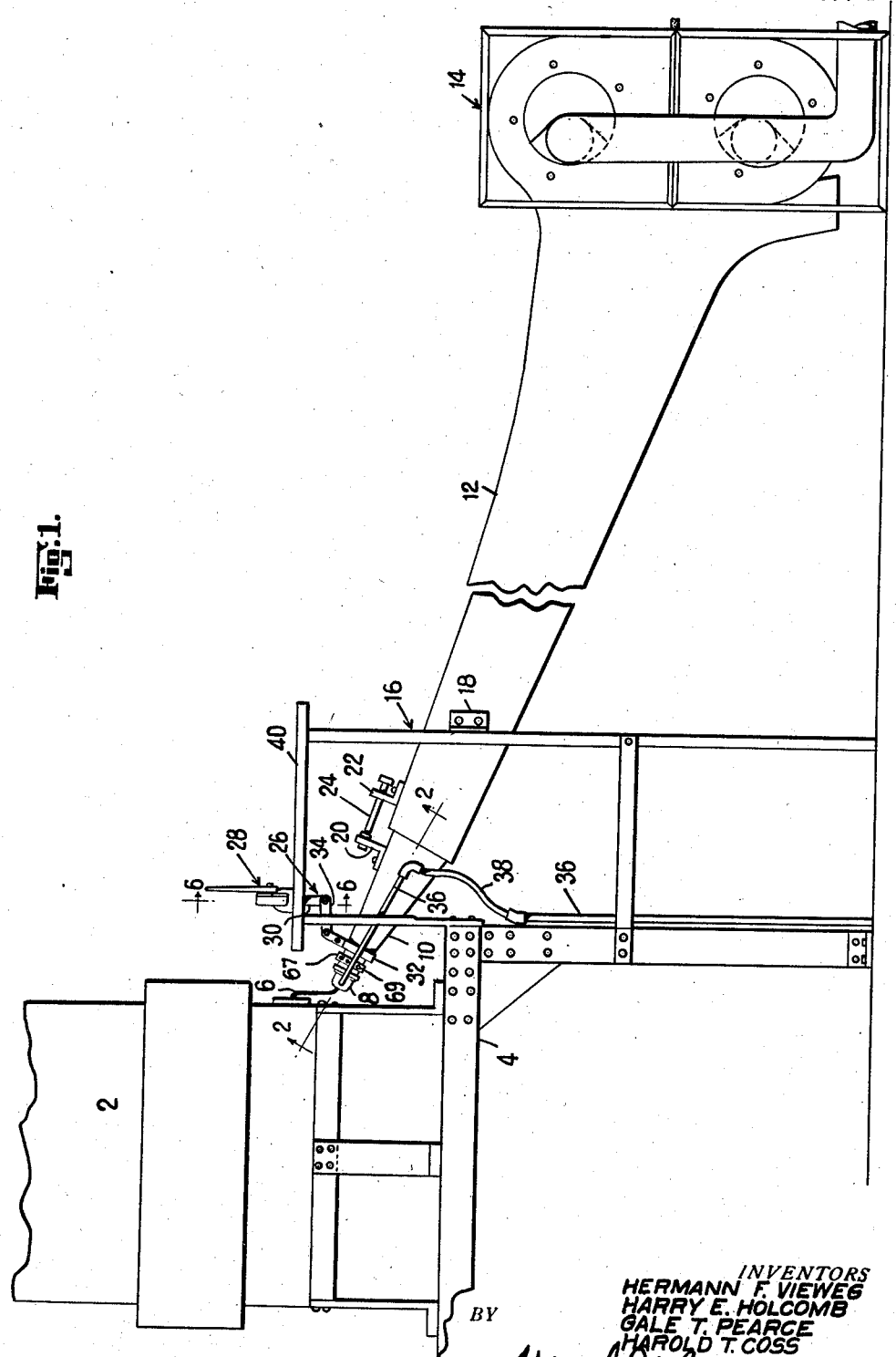
INVENTORS
HERMANN F. VIEWEG
HARRY E. HOLCOMB
GALE T. PEARCE
HAROLD T. COSS
BY Virgil C. Kline ATTORNEY

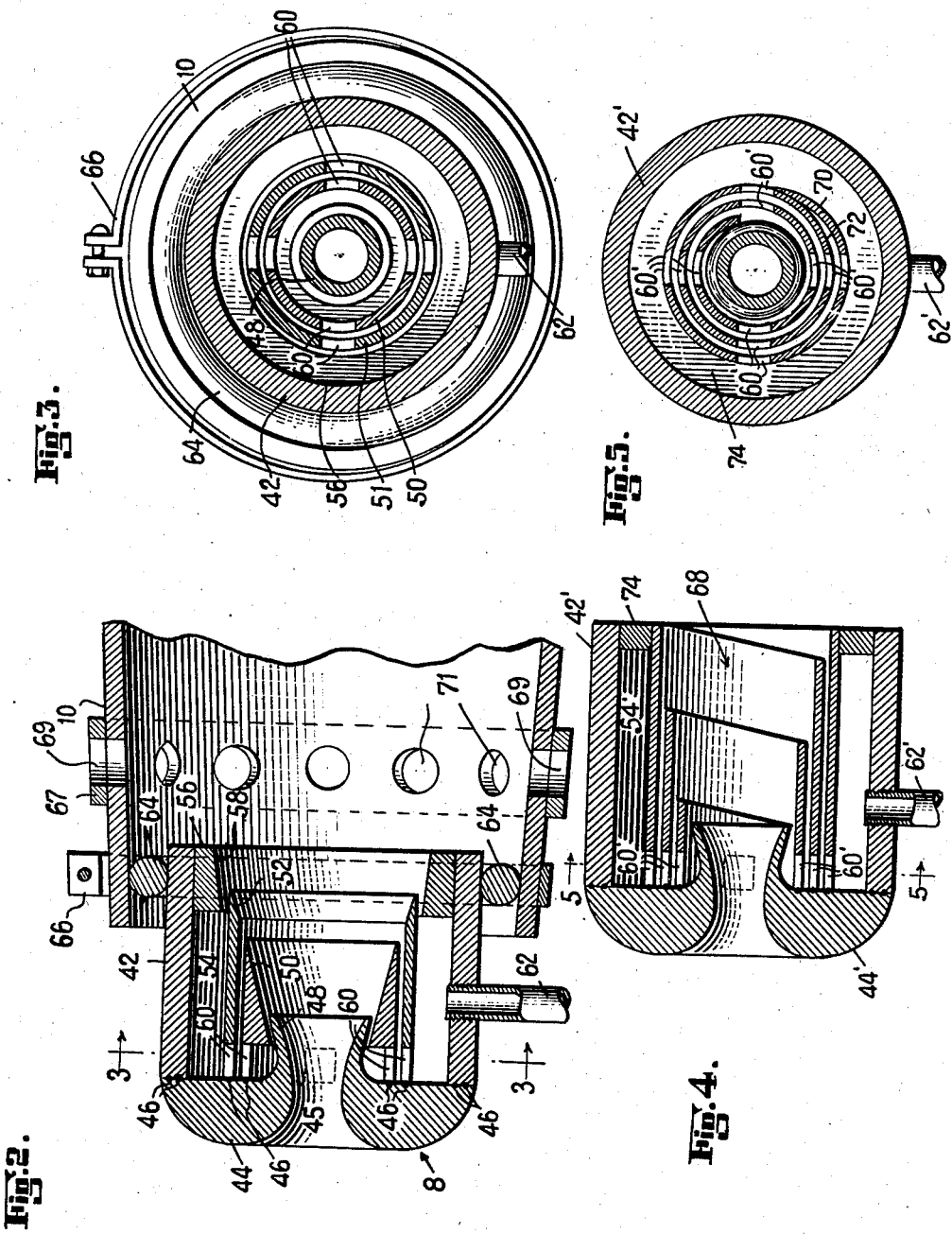

Nov. 12, 1940.  H. F. VIEWEG ET AL  2,221,011
METHOD AND APPARATUS FOR PRODUCING MINERAL WOOL
Filed Sept. 3, 1937  3 Sheets-Sheet 3
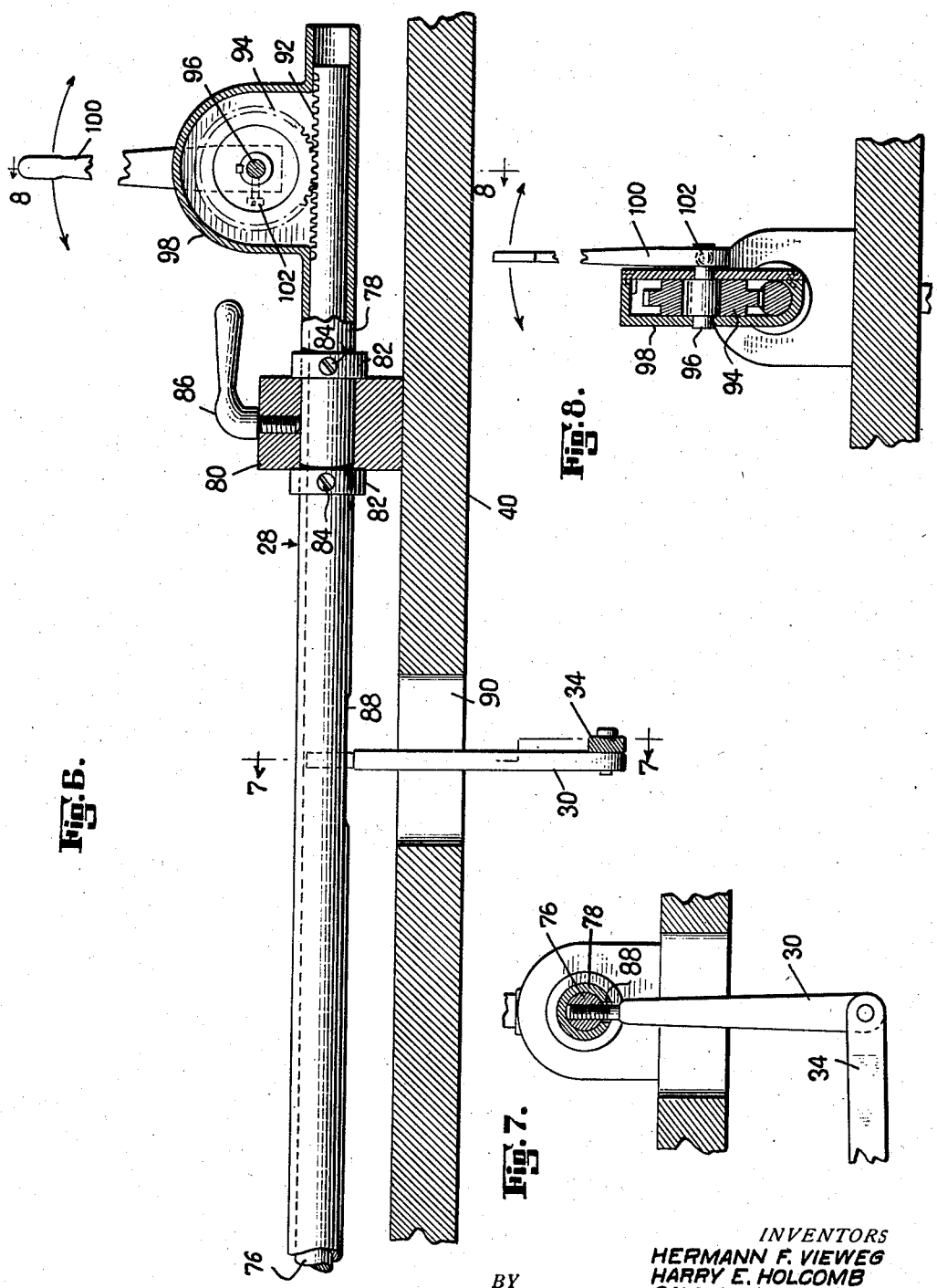
INVENTORS
HERMANN F. VIEWEG
HARRY E. HOLCOMB
GALE T. PEARCE
HAROLD T. COSS
BY Virgil C. Kline
ATTORNEY Patented Nov. 12, 1940

2,221,011

UNITED STATES PATENT OFFICE

2,221,011

METHOD AND APPARATUS FOR PRODUCING MINERAL WOOL

Hermann F. Vieweg, Highland Park, Harry E. Holcomb, South Bound Brook, Gale T. Pearce and Harold T. Coss, Somerville, N. J., assignors to Johns-Manville Corporation, New York, N. Y., a corporation of New York Application September 3, 1937, Serial No. 162,304

10 Claims. (Cl. 83—91)

This invention relates to a method and apparatus for producing mineral wool. More particularly, it relates to a method and apparatus for fiberizing molten material to form mineral wool and an apparatus for receiving the fibers so formed.

It is an object of the present invention to provide a method and apparatus for producing mineral wool which contains a much smaller percentage of non-fibrous material than that produced by methods and apparatus heretofore known.

It is another object of the present invention to provide a method and apparatus for producing mineral wool fibers of greater length and smaller diameter than those produced by previous methods and apparatus.

It is a further object of the present invention to provide a method and apparatus for fiberizing molten material in an efficient and convenient manner.

It is a still further object of the present invention to provide an apparatus for receiving mineral wool fibers from the fiberizing apparatus which is free from clogging during operation.

Other objects and advantages, if not specifically pointed out, will be apparent to those skilled in the art from the following detailed description of what are now considered the preferred embodiments of the present invention.

In the drawings:

Fig. 1 is a side elevational view of an apparatus constructed in accordance with the present invention.

Fig. 2 is a central sectional view taken on the plane indicated by line 2—2 of Fig. 1 and showing a fiberizing nozzle constructed in accordance with the present invention.

Fig. 3 is a vertical sectional view taken substantially on the plane indicated by line 3—3 of Fig. 2.

Fig. 4 is a central sectional view of a modified form of fiberizing nozzle.

Fig. 5 is a vertical sectional view taken substantially on the plane indicated by line 5—5 of Fig. 4.

Fig. 6 is a fragmentary detailed view drawn to an enlarged scale, and partly in section on the plane indicated by line 6—6 of Fig. 1, and showing an apparatus for adjusting the position of the fiberizing nozzle.

Fig. 7 is a fragmentary sectional view taken substantially on the plane indicated by line 7—7 of Fig. 6 and, Fig. 8 is a fragmentary sectional view taken substantially on the plane indicated by line 8—8 of Fig. 6.

Mineral wool is usually produced by melting a suitable raw material, or a mixture of raw materials, such as natural rock or blast furnace slag, in a furnace such as a cupola, and discharging the molten material in the form of a stream. The stream is blasted by a jet of fluid issuing from a nozzle at high velocity and is thereby converted into fibers which are suspended by the fluid and directed by a convenient apparatus such as a large tube to a suitable collecting apparatus. The nozzle used heretofore have not been as efficient as desired. The molten material is usually blasted with such force and in such directions that some of the material is thrown without the zone of action of the fluid stream and lost, and the fibers formed have been intermixed with a large proportion of non-fiberized particles commonly known as "shot." Also, the large cone of dispersion of the fibers which occurs when such nozzles are used has necessitated the use of a relatively large receiving tube, commonly termed a "blow tube," positioned at a considerable distance from the nozzle. This has made it impossible to control the amount of air admitted to the blow tube and has usually resulted in an excessive amount of air entering the blow tube along with the stream of fibers and the fiberizing gas. This excessive air provides a surplus of gas which is objectionable, since some types of collecting devices employ a vacuum to draw the fibers onto the moving foraminous surface, and the added air necessitates the removal of a very large volume of fluid from the blow tube through the foraminous member by the suction producing means.

The present invention overcomes the foregoing defects in the known methods and apparatus for producing mineral wool by providing a nozzle which projects fluid in the form of suction producing jets which draw the molten stream therewithin and successively and substantially continuously act upon the stream of molten material to convert it into fibers. The fibers so formed are then directed into a blow tube which is connected with the nozzle so that the air entrained at that point can be accurately controlled and an excessive amount of air is, therefore, not present for removal by the suction means. The molten material is retained within the zone of action of the gas through the fiber forming and collecting operations.

It has also been the practice heretofore to direct the fiber collection or blow tube upwardly or substantially horizontally, with the result that solid particles and sometimes fibers settle within the blow tube and rapidly form accumulations of such magnitude as to completely obstruct passage of fibers through the tube. This defect has been overcome by the present invention by inclining the blow tube downwardly so that there is practically no tendency for the particles and fibers to deposit in the blow tube and form obstructions.

In addition to preventing the formation of obstructions which clog the blow tube, the downwardly inclined blow tube enhances the operation of the nozzle, since the stream of molten material is deviated very slightly, or not at all, from its normal path by the nozzle. Whereas, when the blow tube is positioned horizontally, the stream of molten material is turned substantially ninety degrees when it falls vertically in front of the nozzle.

In Fig. 1, the furnace 2 for melting the raw material is illustrated as being of the cupola type and is diagrammatically represented since it may take many different forms, any one of which is equally as applicable to the present invention as the cupola type. The cupola 2 is supported by a suitable frame work 4 at an elevated position. The molten material is discharged from the cupola in the form of a stream 6 which is drawn into the nozzle 8 by the action of the fluid flowing therefrom and is thereby fiberized. The nozzle 8 is connected to a movable section 10 of a blow tube 12 which is inclined downwardly and confines and directs the stream of fibers to a suitable collection apparatus 14. The collection apparatus 14 in this instance is a felting apparatus of the two-roll type and has been shown merely diagrammatically since it may take many other forms. A preferred form of collecting device is disclosed in the co-pending patent application of Gale T. Pearce, Serial No. 100,446, filed September 12, 1936.

The collection or blow tube 12 is suitably attached to a frame work 16 as by means of an angle iron 18. The movable section 10 of the blow tube is telescoped within the main body portion of the blow tube 12 and fits sufficiently loosely therein to enable it to be moved both axially of the main body portion and angularly relative thereto. A loose connection between the movable section 10 and the main body of the blow tube is provided by an angle iron 20 connected to the movable section 10 and an angle 22 connected to the fixed main body portion of the blow tube 10. A headed stud 24 is suitably anchored to the angle 20 and is passed through a suitable opening in the angle 22. The head of the stud prevents complete separation of the movable section 10 from the main body portion while permitting limited movement therebetween.

The movable section 10 is supported at its upper end by a linkage 26 which connects it with an adjustment device 28.

The linkage 26 consists of an arm 30 which is connected to the adjustment device 28, a collar 32 which is suitably clamped to the movable section 10, and a link 34 which connects the arm 30 and the collar 32.

Steam or compressed air is supplied to the nozzle 8 by means of a pipe line 36 having a flexible section 38.

An adjustment device 28 is mounted on a platform 40 which is supported by the frame work 16. The platform 40 provides a station for an operator who can watch the stream 6 and move the nozzle 8 and the movable section 10 so as to follow the meandering of the stream 6 by means of the adjustment device 28. The nozzle adjusting device per se comprises the subject matter of a divisional application, S. N. 327,073, filed March 30, 1940 in the name of Gale T. Pearce.

The details of the preferred form of the nozzle of the present invention are shown in Fig. 2. The nozzle comprises a hollow shell 42, which is usually cylindrical but may be formed in any other desired shape. A plate 44 having an aperture 45 therein is attached to one end of the shell 42 by any suitable means such as welding 46. The exposed face of the plate 44 is rounded around the aperture 45 so as to facilitate the entrance of the stream of molten material into the aperture 45 and also permit an appreciable movement of the stream without necessitating movement of the nozzle. The face of the plate is also rounded around the periphery to minimize turbulence in the flow of air into the aperture. The plate 44 may be formed of any suitable material, such as cold rolled steel, which will not be materially corroded by the stream of molten material.

A series of inner shells 48, 50 and 52 of progressively increasing lengths are arranged concentrically within the shell 42. All of the inner shells except the inner-most one are suitably attached to the plate 44 as by welding 46. The inner-most shell 48 could likewise be attached to the plate 44 but for the sake of convenience of manufacture it is usually integrally formed with the plate 44. The shell 48 flares outwardly and the shells 50 and 52 are tapered internally to form a flaring passageway through the nozzle. The inner concentric shells are spaced from each other at short distances, and the outer-most of the inner concentric shells is spaced from the interior of the outer shell 42 at a greater distance, thus forming a chamber 54 which has the outer shell 42 as its outer wall and the inner concentric shells as its interior wall. A ring 56 is pressed into the shell 42 at the end opposite from the plate 44 and extends between the shell 42 and the concentric ring 52 but is slightly spaced from the latter. The ring 56 may be held in position by any suitable fastening means or may be made integral with the shell 42. The ring 56 is tapered at 58 for a purpose which will be later described. The inner concentric shells are ported as shown at 60 to provide communication between the spaces between the concentric shells and the chamber 54.

A pipe 62 is secured in an opening in the shell 42 and supplies pressure fluid, such as steam or compressed air, to the chamber 54. The pressure fluid escapes from between the inner concentric shells and the ring 56 in jets which are in the form of hollow columns which resemble concentric cones or cylinders. The fluid thus escaping at a high velocity creates a suction at the aperture 45 which draws the molten material into the aperture. Since some air is drawn into the aperture at the same time, the molten material will usually be substantially surrounded by air and thus prevented from contacting to any extent with the sides of the aperture. When the material enters the aperture it passes through the inner shell 48 and is first struck by the jet formed by the steam flowing between the shells 48 and 50. The material is very shortly thereafter struck by the jet flowing from between the shells 50 and 52, and finally it is struck by the jet flowing from between the shell 52 and the ring 56. During the course of this successive and substantially continuous blasting of the material it is converted into long and very fine fibers which are relatively free from shot.

The taper 58 on the ring 56 controls the direction of the final cone of fluid, and may be selected so as to confine all of the material within the zone of action of the fiberizing fluid and thereby prevent waste due to material being thrown without the zone of action of the gas.

The degree of taper on the inner concentric shells may be varied as desired to cause the concentric cones to flare to any desired extent depending on the size of the stream of molten material which is to be fiberized and the size of the receiving tube for the fibers.

The hollow columns may be varied in cross sectional shape, if desired, by changing the cross sectional shape of the shells.

The number of inner shells may be varied to form as many or as few concentric cones or cylinders as may be desired. The number so used will usually be as great as can be practically constructed, since the more nearly continuous the fiberizing action can be made, the better the grade of fibers produced.

If desired, the openings between the shells may each take the form of a series of small openings instead of a large, continuous, annular opening. Also, the shells may be replaced by a single wall which has openings formed through it at proper angles to produce suction at the aperture 45.

The movable section 10 of the receiving or blow tube 12 is rigidly connected to the outer shell 42 of the nozzle 8 in any suitable manner. One convenient way of making this connection consists in placing an asbestos or other fire-proof packing 64 between the shell 42 and the section 10, and clamping the section 10 around the packing and thus to the shell 42 by means of a suitable clamping ring 66.

The packing 64 is preferably circular in cross section so as to enable the axis of nozzle 6 to be adjusted relative to the axis of the blow tube to maintain these axes in coaxial alignment, and thereby control the angle at which the stream of fibers enters the blow tube.

The amount of air which enters the blow tube 12 is controlled by a ring valve 67 having openings 69 which can be made to register with corresponding openings 71 in the movable section 10 of the blow tube. Thus the openings 71 can be opened to any extent desired or completely closed by rotating the ring valve 67. In this manner the quantity of air admitted to movable section 10 of the blow tube can be controlled to provide the exact amount necessary to combine with the gas from the nozzle to properly support the fibers in their travel through the blow tube to the collection device.

A modified form of nozzle is shown in Figs. 4 and 5. The modified form comprises a shell 42' and a plate 44' which are identical with the shell 42 and the plate 44, respectively. The inner concentric shells in this modification are supplanted by a spirally shaped member 68 whose convolutions progressively increase in width in a direction away from the plate 44'. The outer convolution 70 is feathered at the end and brought into contact with the adjacent convolution 72 as shown in Fig. 5. The ring 74 is positioned between the shell 42' and the outer convolution 70 of the spirally shaped member. This forms a chamber 54' which is supplied with pressure fluid by means of a pipe 62'. Each convolution of the spirally shaped member is ported as shown at 60' to provide communication between the spaces between the convolutions and the chamber 54'. In this modification the pressure fluid issues from the nozzle in the form of a continuous and spiral jet which acts upon the molten material in substantially the same manner as the concentric cones or cylinders of gas which issue from the jet shown in Fig. 2.

An exemplary adjustment device 28 is shown in detail in Figs. 6, 7 and 8. The arm 30, to which the link 34 is suitably articulated at one end, is suitably threaded at the opposite end and screwed into a threaded aperture in a shaft 76. The shaft 76 is carried within a sleeve 78 which is journaled in suitable bearing supports 80, and prevented from longitudinal movement by sleeves 82 connected to the sleeve 78 on each side of each support 80 by suitable means, such as set screws 84. A clamp screw 86 is threaded into a support 80 and serves to hold the sleeve 78 in any adjusted position. The sleeve 78 is provided with an opening 88 which is sufficiently wide to enable the threaded end of the arm 30 to pass therethrough and is of sufficient length to enable the arm 30 and the shaft 76 to move axially of the sleeve 78 for a limited distance. The arm 30 passes through an opening 90 provided in the platform 40.

The shaft 76 is provided at one end with teeth which form a rack 92 which meshes with a pinion 94 carried by a stud shaft 96 which is journaled in a housing 98 which is suitably connected to or formed integrally with the sleeve 78.

The stud shaft 96 has a hand lever 100 attached thereto by suitable means such as a set screw 102.

By rotating the hand lever 100 in the directions shown by the arrows in Fig. 6, the pinion 94 will be moved and will in turn move the rack 92 on the shaft 76. The movement of the shaft 76 will cause the arm 30 to move along the opening 88 within the sleeve 78, and through the medium of the linkage 26, will cause the movable section of the blow tube 10 and the nozzle 8 to be moved across the front of the cupola 2.

The movement of the hand lever 100 in the direction of the arrows shown in Fig. 8, after the clamping screw 86 has been loosened, will cause the sleeve 78 to rotate and in turn rotate the arm 30 through contact between the arm and the sides of the opening 88 and movable section 10 of the blow tube and the nozzle 8 will be moved through the medium of the linkage 26 towards and away from the cupola 2, as well as upwardly and downwardly, due to the movable connection between the movable section 10 and the main body 12 of the blow tube.

In this manner, an operator standing on the platform 40 can watch the stream of molten material 6 and, through the adjustment device 28 just described, move the nozzle 8 and the attached movable section 10 so as to follow any meandering of the stream 6. The adjustment device may take other specific forms without departing from the scope of the present invention.

The blow tube 12 has been shown as being inclined downwardly at an angle of about 45 degrees, but it is to be understood that the tube may be inclined to any extent, including 90 degrees, if such is desired.

By the use of the present invention, the stream of molten material 6 is converted into fibers. The fibers so formed are received by the movable section 10 of the blow tube 12 and confined and directed by the blow tube 12 to the collecting and felting device 14. The felt so formed is suitably removed from the felting device and further treated or disposed of as desired. It is to be understood that the blow tube 12 may be discharged into any chamber or other collecting device and it is not necessary that the wool formed by the present invention be formed into a felt. Also, the nozzles herein described may be used with a conventional blow chamber which does not include a blow tube if such is desired.

Any suitable binder material may be applied to the mineral wool formed in accordance with the present invention, either by mixing the binder with the pressure fluid entering the nozzle 8 through the pipe 62, or by spraying the binder into the fibers as they flow through the blow tube 12.

The foregoing details have been given for the purpose of explanation, and not limitation, since various changes and modifications may be made in the apparatus described without departing from the spirit of the invention.

What we claim is:

1. An apparatus for producing mineral wool, comprising means for forming a stream of molten material, an aspirating nozzle for converting said stream into fibers including a chambered body having a passage therethrough provided with successively positioned ports for discharging fluid into said passage at a high velocity and in directions so as to create a suction at one end of said passage to draw the molten material therein and successively act upon said material to form the fibers, a downwardly inclined blow tube having a movable section connected to said nozzle, and means whereby the movable section of the blow tube and the nozzle may be simultaneously moved to follow any meander of the stream of molten material.

2. A nozzle for use in the production of mineral wool comprising a chambered body having a walled passage therethrough for receiving a stream of liquid material, means for supplying fluid under pressure to the chamber in said body, the wall of said passage having a spirally shaped port therein for discharging fluid into said passage at a high velocity and in directions so as to create a suction at one end of said passage to draw the liquid stream therein and successively act upon said stream to convert it into fibers.

3. A nozzle for use in the production of mineral wool comprising a hollow outer shell, a plate attached to one end of said shell and provided with a substantially centrally located opening therethrough, a plurality of spaced inner, concentric shells attached to the inner face of said plate and progressively varying in length so as to form a passageway which flares in a direction away from the plate opening, and a ring attached to the interior of the outer shell at the end remote from said plate and extending between the outer shell and the adjacent inner concentric shell but spaced from the latter, all of the inner concentric shells except the innermost one being ported to provide communication between the spaces therebetween, and means for supplying fluid to the interior of the outer shell.

4. A nozzle for use in the production of mineral wool comprising a hollow outer shell, a plate attached to one end of said shell and provided with a substantially centrally located opening therethrough, a spirally shaped member connected at one side to said plate and having its convolutions progressively increasing in width in direction away from said plate, a ring positioned between the largest convolution of said spiral and the interior of said outer shell at the end remote from said plate, said convolutions being ported to provide communication between the spaces therebetween and the interior of said outer shell, and means for supplying fluid to the interior of said hollow shell.

5. The method of making mineral wool comprising melting suitable raw material and discharging the molten material in stream form, and projecting fluid moving at a high velocity and in the form of successive, spaced, substantially cylindrical hollow columnar jets in proximity to said stream to draw the same axially within the columnar jets to be thereby converted into fibers.

6. The method of making mineral wool comprising melting suitable raw material and discharging the molten material in stream form, and projecting fluid moving at high velocity and in the form of successive, hollow, substantially cylindrical columnar jets in proximity to said stream to draw the same axially within the columnar jets to be thereby converted into fibers.

7. A nozzle for use in the production of mineral wool comprising a body having an outwardly diverging passage therethrough for receiving a stream of molten mineral wool forming material, said body including a plurality of chambers having generally concentric walls, said chambers opening into the passage to form successive annular ports, and means for supplying fluid under pressure to the chambers, the walls of at least the chamber defining the initial port being so arranged as to discharge the fluid in substantially the form of an outwardly diverging hollow column.

8. A nozzle for use in the production of mineral wool comprising a body having an outwardly diverging passage therethrough for receiving a stream of molten mineral wool forming material, said body including a plurality of chambers having generally concentric walls, said chambers opening into the passage to form successive annular ports, and means for supplying fluid under pressure to the chambers, the walls of the inner and outermost chambers being so arranged as to discharge the fluid in substantially the form of outwardly diverging hollow columns.

9. A nozzle for use in the production of mineral wool comprising a chambered body having a walled passage therethrough for receiving a stream of mineral wool forming liquid material, means for supplying fluid under pressure to the chamber in said body, the wall of said passage having successively positioned concentric annular ports including means to discharge fluid from said chamber into said passage at a high velocity and in substantially the form of cylindrical hollow columns to create a suction at one end of said passage to draw the liquid stream therein and successively act upon said stream to convert it into fibres.

10. An apparatus for producing mineral wool comprising means for forming a stream of molten mineral wool forming material and an aspirating nozzle comprising a chambered body having a walled passage therethrough for receiving said stream, means for supplying fluid under pressure to the chamber in said body, the wall of said passage having successively positioned concentric annular ports including means to discharge fluid from said chamber into said passage at a high velocity and in substantially the form of cylindrical hollow columns to create a suction at one end of said passage to draw the stream therein and successively act upon said stream to convert it into fibres.

HERMANN F. VIEWEG.
HARRY E. HOLCOMB.
GALE T. PEARCE.
HAROLD T. COSS.